US010899472B2

(12) United States Patent
Carthew et al.

(10) Patent No.: US 10,899,472 B2
(45) Date of Patent: Jan. 26, 2021

(54) VEHICLE MOUNTED LAUNCHER FOR FIXED-WING UNMANNED AERIAL VEHICLE

(71) Applicant: Ford Global Technologies, LLC, Dearborn, MI (US)

(72) Inventors: James Carthew, Oakland, CA (US); Aditya Singh, San Francisco, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 554 days.

(21) Appl. No.: 15/675,013

(22) Filed: Aug. 11, 2017

(65) Prior Publication Data

US 2019/0047726 A1    Feb. 14, 2019

(51) Int. Cl.
*B64F 1/06* (2006.01)
*B64C 39/02* (2006.01)

(52) U.S. Cl.
CPC .............. *B64F 1/06* (2013.01); *B64C 39/024* (2013.01); *B64C 2201/084* (2013.01); *B64C 2201/104* (2013.01); *B64C 2201/165* (2013.01); *B64C 2201/208* (2013.01)

(58) Field of Classification Search
CPC ....... B64F 1/06; A63B 69/406; A63B 69/402; B64C 2201/084; F41F 7/00; F41F 3/0406; F41G 7/00; F41G 5/00
USPC ....................................................... 701/3, 15
See application file for complete search history.

(56) References Cited

U.S. PATENT DOCUMENTS

| 5,807,198 A | * | 9/1998 | Grimm | A63B 65/00 |
| | | | | 473/613 |
| 7,210,654 B1 | | 5/2007 | Cox et al. | |
| 8,028,952 B2 | | 10/2011 | Urnes, Sr. | |
| 8,955,800 B2 | | 2/2015 | McGeer et al. | |
| 9,387,940 B2 | | 7/2016 | Godzdanker et al. | |
| 2015/0027220 A1 | * | 1/2015 | Halfon | G01S 17/023 |
| | | | | 73/170.11 |
| 2016/0176523 A1 | | 6/2016 | Duncan et al. | |
| 2016/0347477 A1 | | 12/2016 | Tully et al. | |
| 2017/0122490 A1 | * | 5/2017 | Verstrate | F16M 11/08 |
| 2017/0252630 A1 | * | 9/2017 | Tomlinson | A63B 69/002 |
| 2017/0326414 A1 | * | 11/2017 | York | A63B 63/08 |

FOREIGN PATENT DOCUMENTS

| CN | 104803006 A | 7/2015 |
| DE | 102008047775 A1 | 4/2010 |

* cited by examiner

*Primary Examiner* — Timothy D Collins
*Assistant Examiner* — Terri L Filosi
(74) *Attorney, Agent, or Firm* — David Coppiellie; Bejin Bieneman PLC

(57) ABSTRACT

A launch includes a frame including a platform defining a slot designed to slideably receive a rudder of a fixed-wing unmanned aerial vehicle. The launch includes two drive wheels rotatably supported by the frame and defining a space between each other. The space is open to the slot and designed to receive the rudder. The launch includes at least one variable speed drive wheel motor supported by the frame and operatively engaged with the drive wheels.

14 Claims, 7 Drawing Sheets

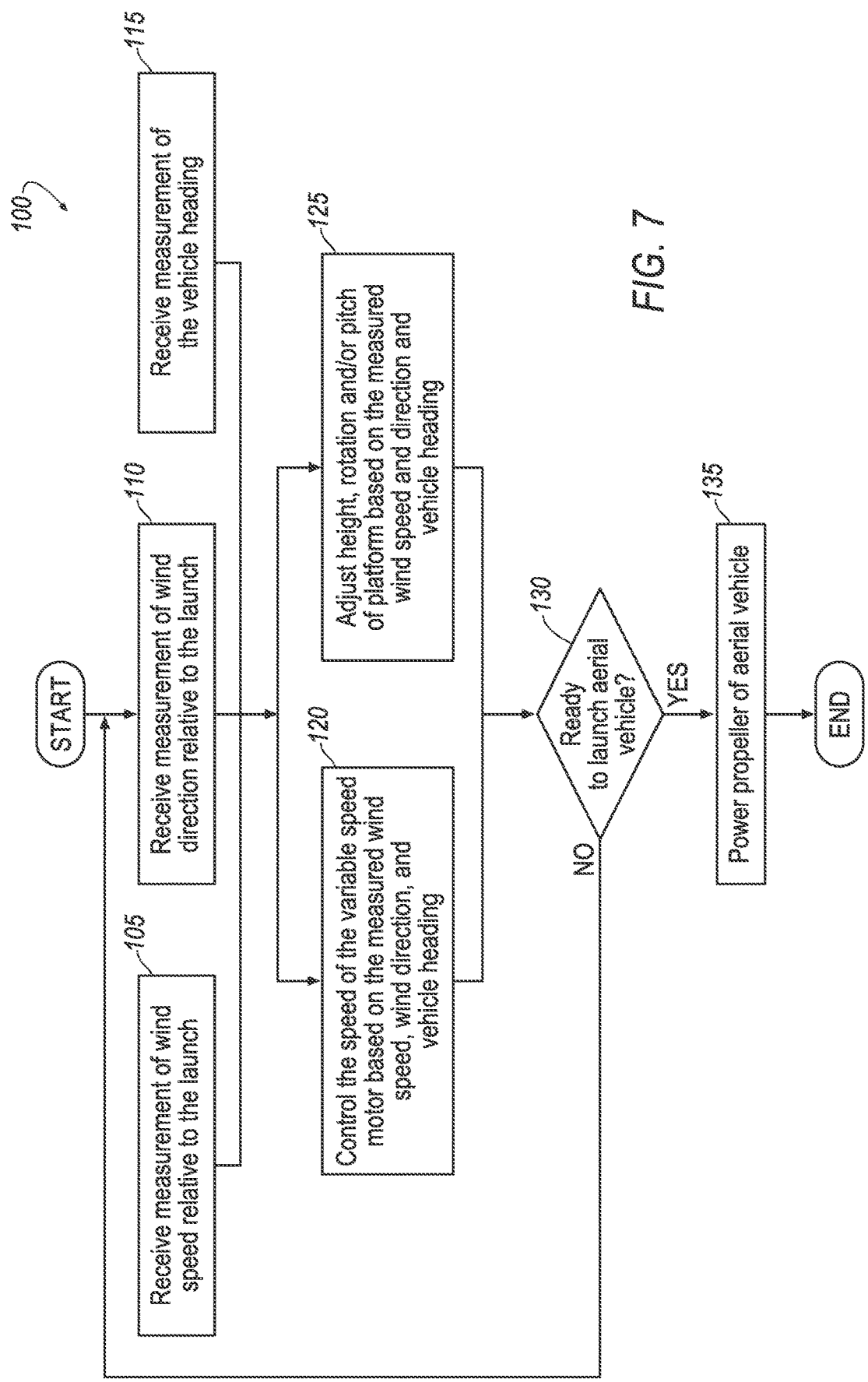

VEHICLE MOUNTED LAUNCHER FOR FIXED-WING UNMANNED AERIAL VEHICLE

BACKGROUND

A fixed-wing unmanned aerial vehicle (FW-UAV) includes a body and wings fixed relative to the body. The body supports a motor and a propeller connected to the motor to propel the aerial vehicle. FW-UAVs provide extended flight times and ranges that can make them attractive solutions to various unmanned aerial vehicle applications.

Small FW-UAVs are generally hand-launched, and are typically not capable of vertical take-off and landing. Take-offs may rely on tail winds to generate as much lift as possible in the shortest distance possible. However, when launched from a moving ground vehicle, the moving ground vehicle generates its own aerodynamic influence, e.g. a turbulent boundary layer, that can disorient wind sensors on the FW-UAV. In addition, some traditional launches that use loaded bands, or catapults, are too large to fit in some moving ground vehicles. These types of traditional launches also do not accommodate for varying driving speeds of the moving ground vehicle.

BRIEF DESCRIPTION OF THE DRAWINGS

FIG. 7 is a flow chart.

DETAILED DESCRIPTION

Figure 1:
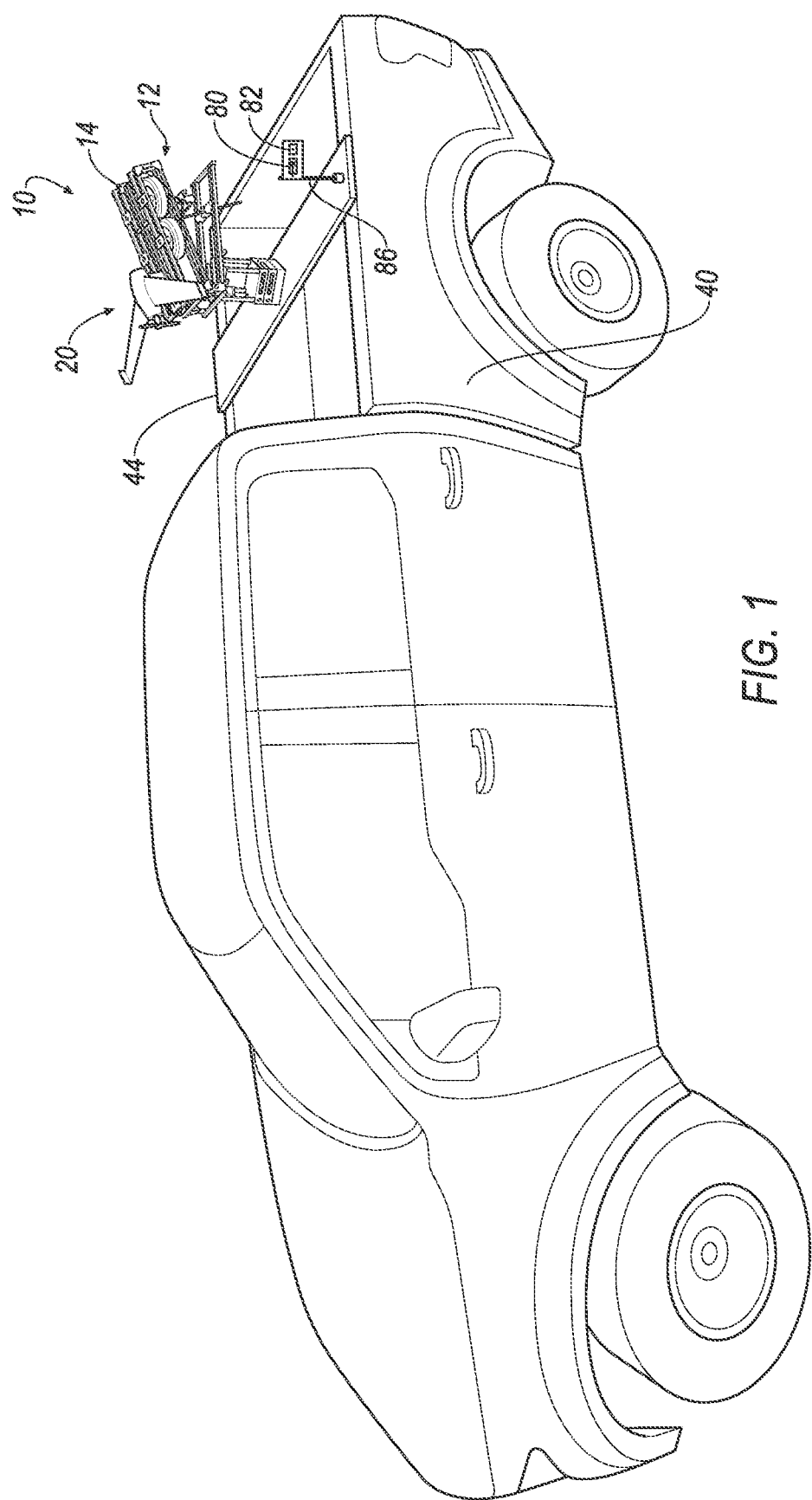
FIG. 1 is a perspective view of a launch and a fixed-wing unmanned aerial vehicle supported on a vehicle.

An example launch includes a frame including a platform defining a slot designed to slideably receive a rudder of a fixed-wing unmanned aerial vehicle. The launch includes two drive wheels rotatably supported by the frame and defining a space between each other. The space is adjacent the slot and is designed to receive the rudder. The launch includes at least one variable speed drive wheel motor supported by the frame and operatively engaged with the drive wheels.

The launch may include a computer programmed to receive measurements of the wind speed and direction relative to the launch and programmed to control the speed of the at least one drive motor based at least on the measurements of the wind speed and direction relative to the launch. The computer may be programmed to receive a measurement of a vehicle heading and may be programmed to control the speed of the at least one drive motor based at least on the measurement of the vehicle heading.

The launch may include a base supporting the frame and at least one position motor configured to adjust at least one of rotation of the platform relative to the base, height of the platform relative to the base, and launch angle of the platform relative to the base. The computer may be programmed to adjust the at least one position motor based at least on the measurement of the wind speed and direction relative to the launch and based at least on the measurement of the vehicle heading.

The launch may include at least one sensor configured to measure wind speed and direction relative to the launch. The launch may include a base supporting the frame, and the at least one sensor may be supported on the base. The at least one sensor may be a wind vane, an airspeed sensor on the wind vane, and a magnetometer on the wind vane.

The launch includes a base supporting the frame and at least one position motor configured to adjust at least one of rotation of the platform relative to the base, height of the platform relative to the base, and launch angle of the platform relative to the base. The computer may be programmed to adjust the at least one position motor based at least on the measurements of the wind speed and direction relative to the launch.

The computer may be programmed to control a propeller of the fixed-wing unmanned aerial vehicle to move the rudder into engagement with the drive motor.

The launch may include a base supporting the frame, and the platform may be moveable relative to the base in three degrees of freedom.

The launch may include a base supporting the frame, and a lifting mechanism between the base and the platform, and the lifting mechanism may be designed to translationally move the platform relative to the base.

The launch may include a base supporting the frame, and a rotating mechanism between the base and the platform, and the rotating mechanism may be designed to rotate the platform relative to the base.

The launch may include a base supporting the frame, and a pivoting mechanism between the base and the platform, and the pivoting mechanism may be designed to pivot the platform relative to the base.

An example computer includes a memory and a processor programmed to execute instructions stored in the memory. The instructions include receiving a measurement of wind speed and direction relative to a launch on a vehicle, and controlling the speed of the at least one drive motor of the launch to propel a fixed-wing unmanned aerial vehicle based at least on the measurements of the wind speed and direction relative to the launch.

The instructions may include adjusting at least one position motor to adjust at least one of rotation of a platform of the launch relative to a base of the launch, height of the platform relative to the base, and launch angle of the platform relative to the base based at least on measurements of the wind speed and direction relative to the launch.

The instructions may include receiving a measurement of vehicle heading of the vehicle, and controlling the speed of the at least one drive motor of the launch based on the vehicle heading. The instructions may include adjusting at least one position motor to adjust at least one of rotation of a platform of the launch relative to a base of the launch, height of the platform relative to the base, and launch angle of the platform relative to the base based at least on the measurements of the wind speed and wind direction relative to the launch.

The instructions may include controlling a propeller of the fixed-wing unmanned aerial vehicle to move the rudder into engagement with the drive motor.

An example launch kit includes a frame including a platform defining a slot. The kit includes a rudder for a fixed-wing unmanned aerial vehicle. The rudder is slideably engageable with the slot. The kit includes two drive wheels rotatably supported by the frame and engageable with the rudder. At least one variable speed motor is supported by the frame and operatively engaged with the drive wheels.

With reference to the Figures, wherein like numerals indicate like parts throughout the several views, a launch 10 includes a frame 12 having a platform 14. As shown in FIGS. 1-4, the platform 14 defines a slot 16 designed to slideably receive a rudder 18 of a fixed-wing unmanned aerial vehicle 20 (hereinafter referred to as "aerial vehicle 20"). The launch 10 includes two drive wheels 22 rotatably supported by the frame 12 and defining a space 24 between each other. The space 24 is adjacent the slot 16 and designed to receive the rudder 18. The launch 10 includes at least one variable speed drive wheel motor 26 supported by the frame 12 and operatively engaged with the drive wheels 22.

The aerial vehicle 20 may be positioned on the platform 14 such that the rudder 18 of the aerial vehicle 20 extends through the slot 16, as shown in FIG. 1. Prior to launch of the aerial vehicle 20, the rudder 18 is spaced from drive wheels 22. To launch the aerial vehicle 20, the aerial vehicle 20 is advanced along the platform 14 to move the rudder 18 into the space 24 between the drive wheels 22, and the drive wheels 22 engage the rudder 18 to propel the rudder 18 from the platform 14. The positioning of the space 24 to be adjacent the slot 16 allows the platform 14 of the launch 10 to be compact in size while enabling quick and effective launch of the aerial vehicle 20 from the launch at a selected time.

As described further below, the variable speed drive wheel motor 26 may be operated at a speed to launch 10 the aerial vehicle 20 from the launch 10 at a desired speed, i.e., to engage propel the rudder 18 along the slot 16 at a desired speed. For example, as also described further below, a computer 28 may instruct the variable speed drive wheel motor 26 to operate at a desired speed.

Figure 2:
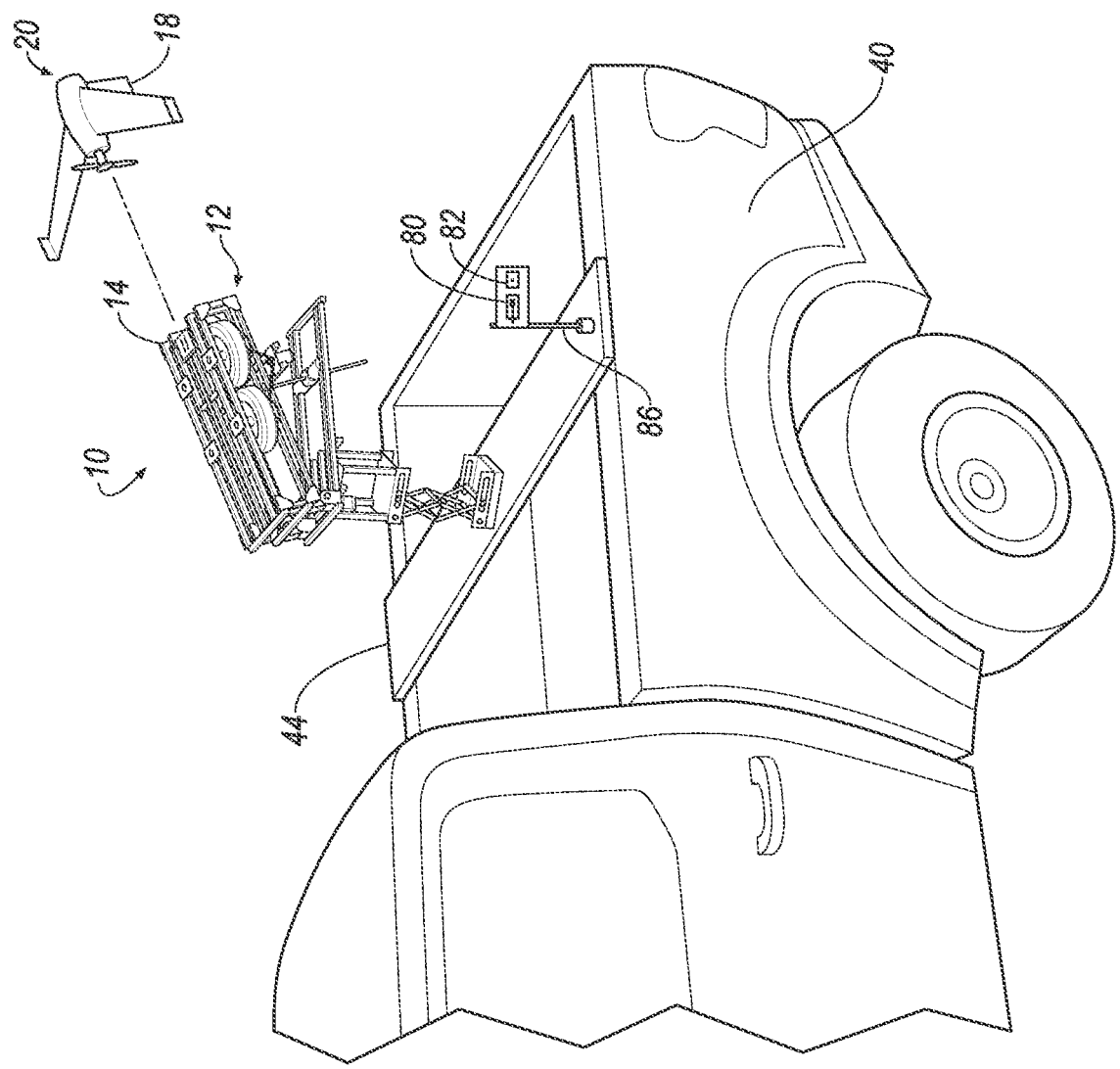
FIG. 2 is a perspective view of the launch on the vehicle with the fixed-wing unmanned aerial vehicle separated from the launch to identify a launch kit.
Figure 3:
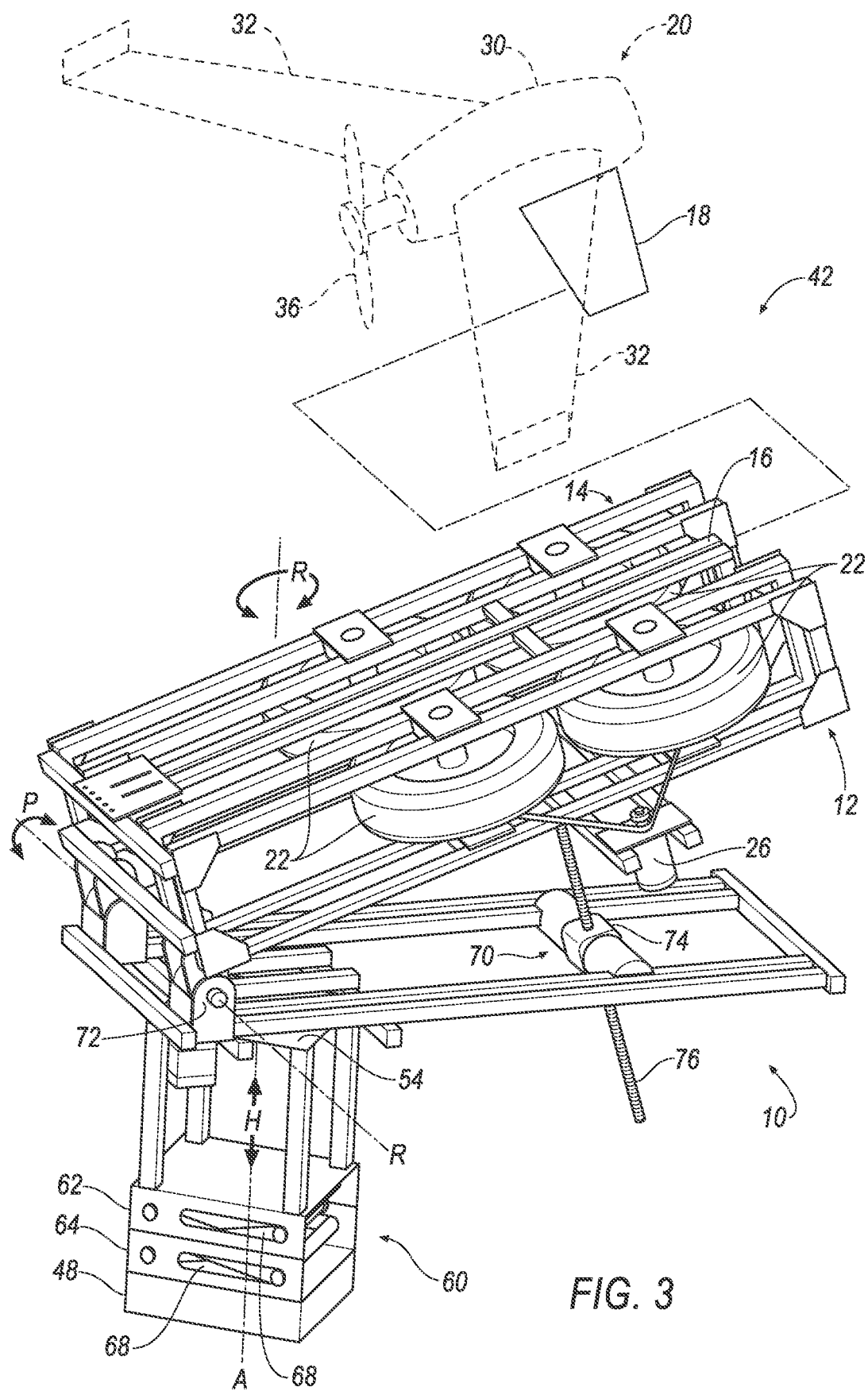
FIG. 3 is a perspective view of the launch.

With reference to FIGS. 1-3, the aerial vehicle 20 includes a body 30 and wings 32 fixed relative to the body 30, as is known in the art. The body 30 supports a motor 34 and a propeller 36 connected to the motor 34 to propel the aerial vehicle 20. The aerial vehicle 20 may include a computer 38 for controlling the propeller 36, and the computer 28 may wirelessly communicate with the computer 28, e.g., to communicate the location of the aerial vehicle 20, data collected by the aerial vehicle 20, sound, video, etc. The aerial vehicle 20 may include sensors, cameras, etc., for collecting data.

With continued reference to FIGS. 1-3, as set forth above, the rudder 18 of the aerial vehicle 20 is fixed to the body 30. The rudder 18 extends downwardly from the body 30 and may be used to propel the aerial vehicle 20 during launch, as described above, and may be used to guide stabilize the flight of the aerial vehicle 20. The rudder 18 may be removably fixed to the body 30, e.g., with fasteners (not shown).

With reference to FIGS. 1 and 2, the launch 10 may be supported on a vehicle 40, i.e., a ground vehicle 40, and the vehicle 40 may transport the launch 10 to launch the aerial vehicle 20 at a desired location. The vehicle 40 may, for example, be any suitable type of automobile. For example, the vehicle 40 may be a pick-up truck. In such an example, the launch 10 may be mounted to the bed of the pickup truck. Specifically, the launch 10 may be fixed relative to the bed of the pickup truck, e.g., to sides of the bed. As another example, the launch 10 may be fixed to the bed of the pickup truck inside the bed of the pickup truck, e.g., disposed on the bottom of the bed.

A launch kit 42 may include the launch 10 and the rudder 18 for the aerial vehicle 20. The launch kit 42 may be obtained for attachment to the vehicle 40. For example, the launch kit 42 may be attached to the vehicle 40 as an option during the purchase of the vehicle 40 from an original equipment manufacturer. As another example, the launch kit 42 may be obtained by an owner or operator of a vehicle 40, i.e., as an aftermarket product.

Since the kit 42 includes both the launch 10 and the rudder 18, the slot 16, the space 24, and the rudder 18 may be designed, e.g., sized, shaped, etc., to operate together to launch 10 the aerial vehicle 20 to which the rudder 18 is attached. For example, the rudder 18 and the platform 14 are dimensioned to ensure that the rudder 18 is slideably engageable with the slot 16. The aerial vehicle 20 may be obtained separately from the kit, and the rudder 18 may be fixed to the body 30 of the aerial vehicle 20. By obtaining the launch 10 and the rudder 18 as a kit 42, this configuration ensures proper relative dimensions of the rudder 18 and the launch 10 to ensure proper launch 10 of the aerial vehicle 20. The kit 42 may include several rudder 18 that are identical to each other to account for potential damage to one of the rudder 18. As another example, the kit 42 may include both the launch 10 and the aerial vehicle 20, e.g., including the rudder 18 fixed to the body 30.

Figure 4:
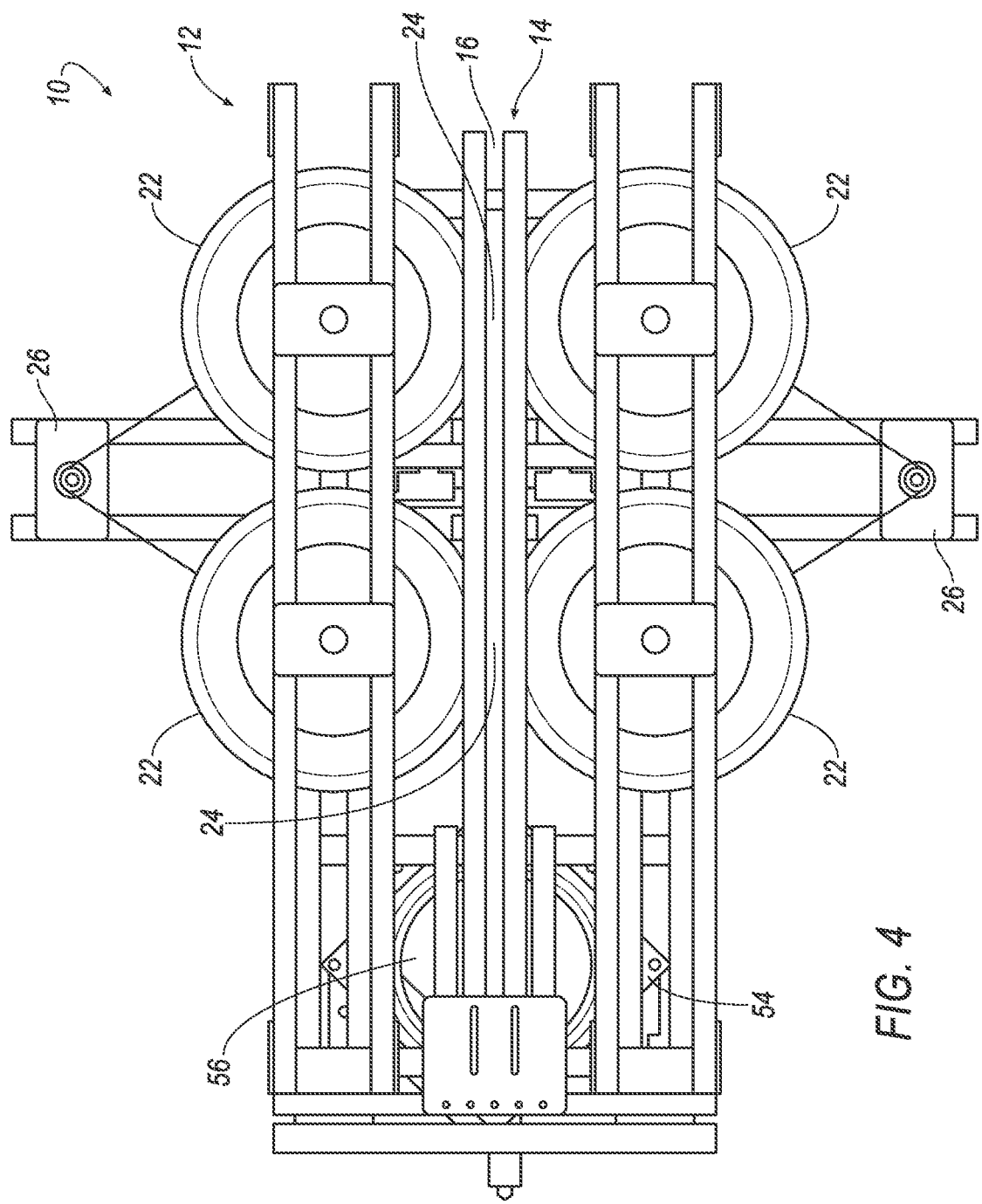
FIG. 4 is a top view of the launch.
Figure 5:
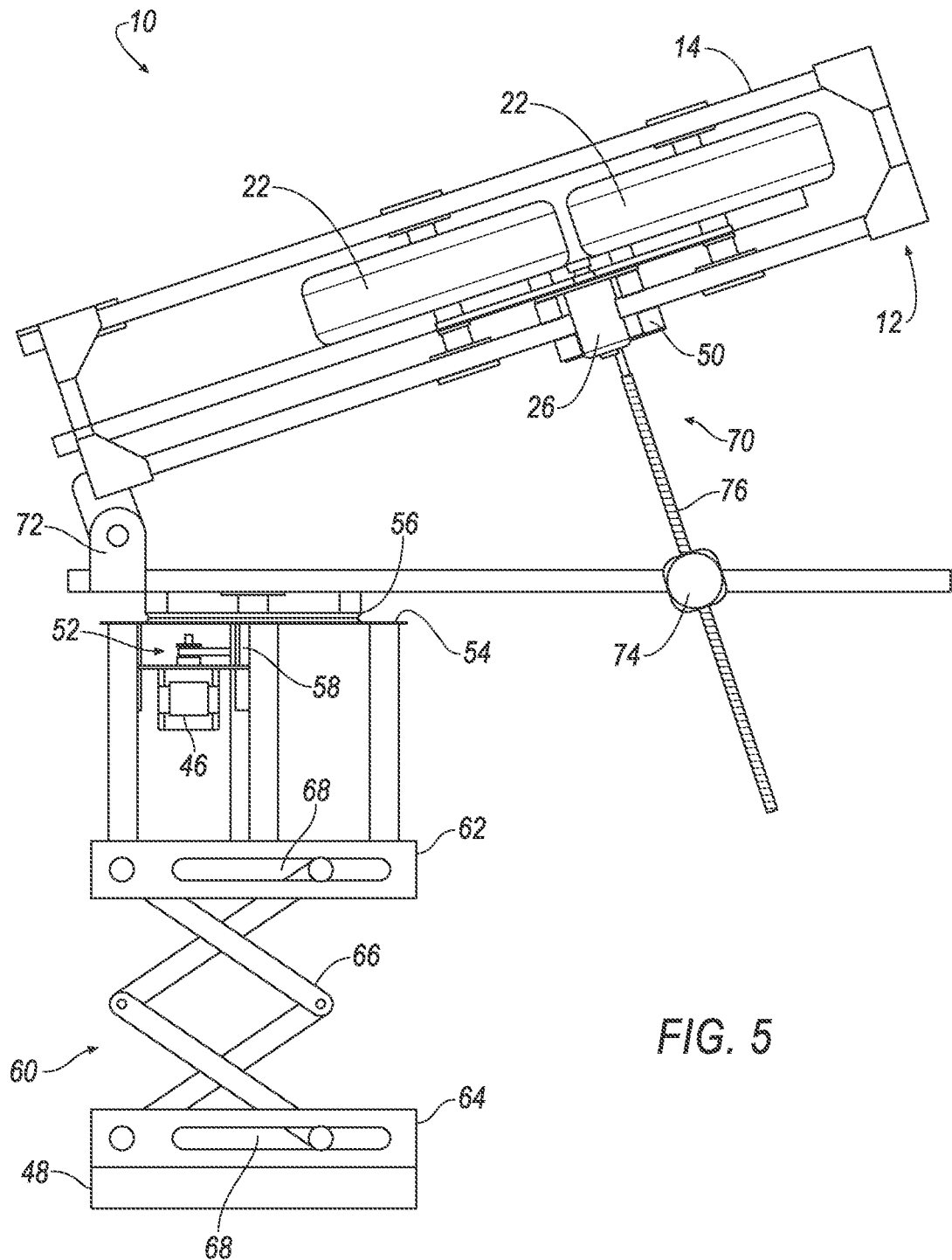
FIG. 5 is a side view of the launch.

With reference to FIGS. 3-5, the frame 12 may support the aerial vehicle 20 while to transport the aerial vehicle 20 as the vehicle 40 is operated. The frame 12 may include several beams (not numbered) fixed together. The beams may be, for example, extruded metal, such as extruded aluminum. Alternatively, the frame 12 may have any suitable construction, e.g. may be a monolithic frame.

As set forth above, the frame 12 includes the platform 14, which supports the aerial vehicle 20 while the aerial vehicle 20 is transported by the vehicle 40 and is designed to guide the aerial vehicle 20 as the aerial vehicle 20 is launched from the launch 10. The platform 14 may be the top surface of the frame 12. The platform 14 may be flat.

With reference to FIGS. 3 and 4, the slot 16 may be elongated longitudinally along the platform 14. The slot 16 extends through the platform 14 and is open to the space 24 between the drive wheels 22. In other words, a void exists directly between the slot 16 and the space 24 and is uninterrupted by another component that would prevent the rudder 18 from sliding along both the slot 16 and the space 24. Said differently, the rudder 18 may extend through both the slot 16 and the space 24 without physical interference from another component that prevents the rudder 18 from sliding along the slot 16 while being launched from the launch 10. The slot 16 may be adjacent the space 24, i.e., with the lack of anything between the slot 16 and the space 24. The slot 16 and the space 24 may space 24d from each other a distance shorter than the length of the rudder 18. Accordingly, as the rudder 18 moves along the slot 16, the rudder 18 will engage the drive wheels 22 in the space 24. The slot 16 may have a closed end and an open end. The closed end may be covered by a plate, as shown in FIGS. 3 and 4. The aerial vehicle 20 may rest on the closed end while at rest on the launch 10. While the aerial vehicle 20 is launched, the rudder 18 exits the slot 16 at the open end, at which time the aerial vehicle 20 is disengaged with the launch 10 and is airborne.

With reference to FIGS. 3-5, the drive wheels 22 are rotatably supported by the frame 12, e.g., on posts, bearings, etc. The launch 10 may include any suitable number of pairs of drive wheels 22, with each pair of drive wheels 22 opposing each other and defining a space 24 that receives the rudder 18. For example, as shown in the Figures, the launch 10 may include four drive wheels 22, i.e., two pairs of drive wheels 22. The opposing drive wheels 22 rotate in opposite directions to propel the rudder 18, and thus the entire aerial vehicle 20, toward the open end of the slot 16. The drive wheels 22 may be formed of any suitable material, e.g., rubber, elastomer, etc.

The variable speed drive wheel motor 26 drives the drive wheels 22. The variable speed drive wheel motor 26 may be connected to the drive wheels 22 in any suitable way, e.g., a belt as shown in FIGS. 3 and 4. The launch 10 may include any suitable number of variable speed drive wheel motor 26s, e.g., two as shown in the Figures. In examples where the launch 10 includes more than one variable speed drive wheel motor 26, each variable speed drive wheel motor 26 may be driven at a common speed. Since the drive wheel motor 26 is "variable speed," the variable speed drive wheel motor 26 may drive the drive wheels 22 at various speeds. The speed of the variable speed drive wheel motor 26 is selected to launch 10 the aerial vehicle 20 from the launch 10 at a desired speed. As set forth below, the computer 28 controls the speed of the variable speed drive wheel motor 26.

With reference to FIGS. 3-5, the launch includes a base 44 that supports the frame 12. The base 44 may be, for example, elongated and connected to the vehicle 40, e.g., the box of the bed of the pickup truck in the example shown in FIGS. 1 and 2.

The platform 14 of the frame 12 is moveable relative to the base 44 in three degrees of freedom. Specifically, the rotation, height, and pitch (i.e., launch angle) of the platform 14 is moveable relative to the frame 12. The rotation of the platform 14 relative to the base 44 is the rotation of the platform 14 about a central axis A of the base 44, as identified with arrow R in FIG. 3. The height of the platform 14 relative to the base 44 is the position of the platform 14 along the central axis A of the base 44, as identified with H in FIG. 3. The pitch of the platform 14 relative to the frame 12 is the angle of the platform 14 about a rotational axis R between the frame 12 and the base 44, as identified with P in FIG. 3.

The launch 10 includes at least one position motor 46, 48, 50 configured to adjust the orientation of the platform 14, i.e., at least one of rotation of the platform 14 relative to the base 44, height of the platform 14 relative to the base 44, and pitch of the platform 14 relative to the base 44. For example, with reference to FIGS. 3 and 5, the position motors include a rotation motor 46 to adjust the rotation of the platform 14 relative to the base 44, a height motor 48 to adjust the height of the platform 14 relative to the base 44, and a pitch motor 50 to adjust the pitch of the platform 14 relative to the base 44. Each position motor 46, 48, 50 is controlled by the computer 28, as discussed further below. Each position motor 46, 48, 50 may be, for example, a stepper motor. The position motors 46, 48, 50 and/or the variable speed drive wheel motor 26 may be powered by an external power source, e.g., the battery of the vehicle 40, or may include an internal power source.

With reference to FIGS. 3 and 5, the launch 10 may include a rotating mechanism 52 between the base 44 and the platform 14. The rotating mechanism 52 is designed to rotate the platform 14 relative to the base 44. Specifically, as one example, the rotating mechanism 52 may include a stationary plate 54 connected to the base 44, and a rotating plate 56 connected to the frame 12. The rotation motor 46 is fixed to one of the stationary plate 54 and the rotating plate 56, and a spindle 58 is fixed to the other of the stationary plate 54 and the rotating plate 56. For example, as shown in FIGS. 3 and 5, the rotation motor 46 is fixed to the stationary plate 54, and the spindle 58 is fixed to the rotating plate 56.

In this example, the spindle 58 extends through a hole (not numbered) in the stationary plate 54, and the rotation motor 46 is connected to the spindle to drive the spindle 58 to rotate the rotating plate 56. The rotation motor 46 may be connected to the spindle in any suitable way, e.g., a belt as shown in FIG. 5. Alternatively, the rotating mechanism 52 may be of any suitable type to rotate the platform 14 relative to the base 44.

With continued reference to FIGS. 3 and 5, the launch 10 may include a lifting mechanism 60 between the base 44 and the platform 14. The lifting mechanism 60 is designed to translationally move the platform 14 relative to the base 44, i.e., adjust the height of the platform 14 relative to the base 44. The lifting mechanism 60, for example may include a top plate 62, a bottom plate 64, and a scissor jack 66 between the top plate 62 and the bottom plate 64. Each of the top plate 62 and the bottom plate 64 includes a channel 68 that slideably engages the scissor jack 66. The height motor 48 is connected to the scissor jack 66 to actuate the scissor jack 66 to raise and lower the platform 14 relative to the base 44. Alternatively, the lifting mechanism 60 may be of any suitably type to raise and lower the platform 14 relative to the base 44.

With continued reference to FIGS. 3 and 5, the launch 10 includes a pivoting mechanism 70 between the base 44 and the platform 14. The pivoting mechanism 70 is designed to pivot the platform 14 relative to the base 44. As one example, the pivoting mechanism 70 may include a rotational joint 72 between the base 44 and the frame 12. Spaced from the rotational joint 72, the pivoting mechanism 70 includes the pitch motor 50 connected to one of the base 44 and the frame 12, and an internally threaded block 74 rotatably connected to the other of the base 44 and the frame 12. A threaded rod 76 extends from the pitch motor 50 and threadedly engages the threaded block 74. The pitch motor 50 drives the threaded rod 70 to rotate the threaded rod 70 relative to the internally threaded block 74. As the pitch motor 50 rotates the threaded rod 70 relative to the internally threaded block the frame 12 rotates relative to the base 44 about the rotational joint 72 to adjust the pitch of the platform 14. Alternatively, the pivoting mechanism 70 may be of any suitable type to adjust the pitch of the platform 14 relative to the base 44.

Figure 6:
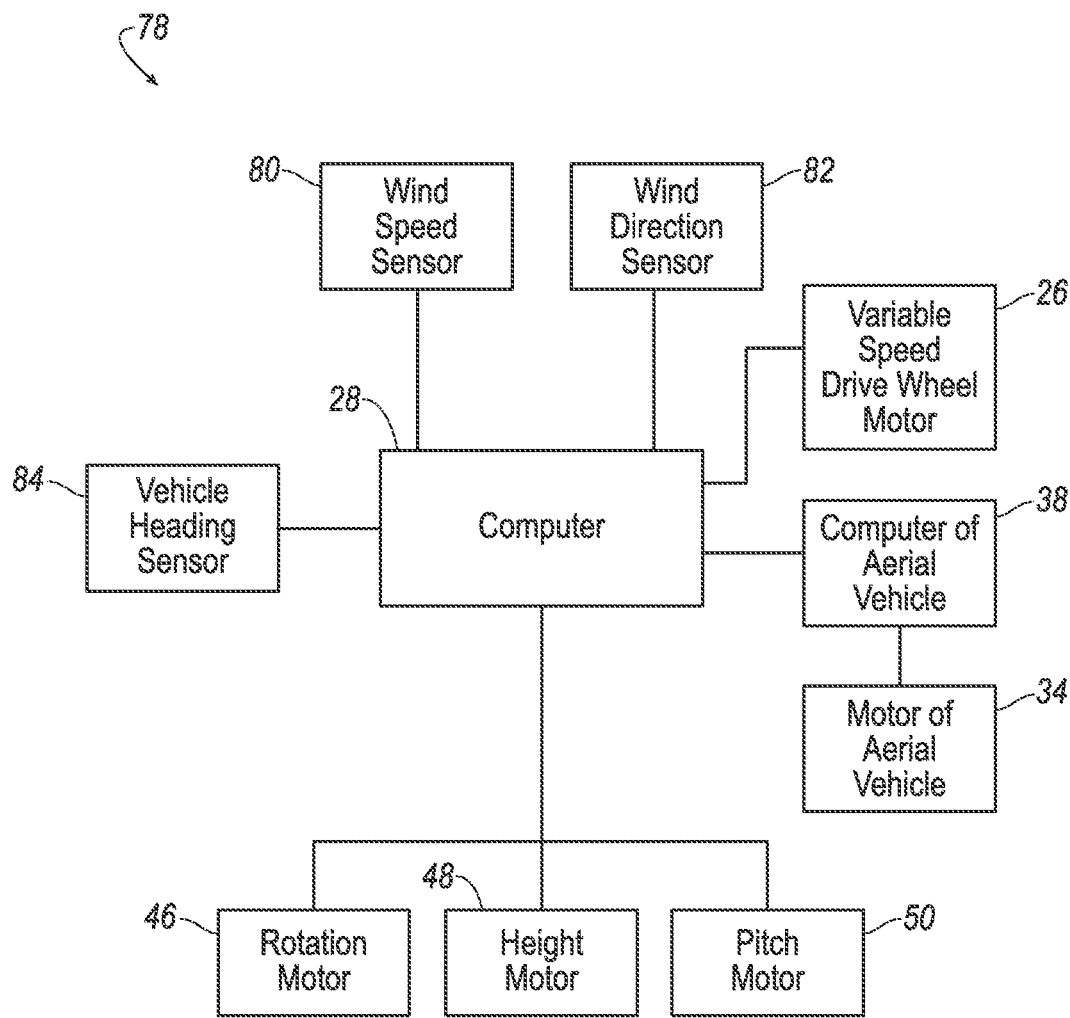
FIG. 6 is a schematic of a control system.

With reference to FIG. 6, a control system 78 for controlling the launch 10 includes the computer 28, the variable speed drive wheel motor 26, and the position motors 46, 48, 50 (e.g., the rotation motor 46, height motor 48, and pitch motor 50). The control system 78 includes at least one sensor configured to measure wind speed and direction relative to the launch 10. The at least one sensor may include a wind speed sensor 80 and a wind direction sensor 82 for measuring the speed and direction, respectively, of the wind relative to the launch 10. The control system 78 includes a vehicle heading sensor 84 for measuring the direction of the vehicle 40. As set forth further below, the computer 28 controls the speed of the variable speed drive wheel motor 26 and the orientation of the platform 14 (by controlling the position motors 46, 48, 50) based on input from the wind speed sensor 80, wind direction sensor 82, and vehicle heading sensor 84.

The wind speed sensor 80 and the wind direction sensor 82 may be supported on the base 44. As another example, the wind speed sensor 80 and/or the wind direction sensor 82 may be supported on the body 30 of the vehicle 40. For example, the launch 10 may include a wind vane 86 rotatably coupled to the base 44 of the launch 10, and the wind speed sensor 80 and/or the wind direction sensor 82 may be supported on the wind vane 86. Accordingly, wind movement relative to the launch 10 rotates the wind vane 86, allowing the wind speed sensor 80 and the wind direction sensor 82 to measure the speed and direction, respectively, of the wind relative to the launch 10.

The wind speed sensor 80 may be, for example, include a Pitot tube, e.g., may be a Pitot tube airspeed measurement unit. The wind direction sensor 82 may be, for example, a magnetometer. The vehicle heading sensor 84 may be a component of the vehicle 40. As another example, the vehicle heading sensor 84 may be supported on the base 44 of the launch 10. The vehicle heading sensor 84 may be, for example, a magnetometer.

The computer 28 may be a component of the launch 10 or a component of the vehicle 40. The computer 28 may be used to perform the method 100 shown in FIG. 7, and described below. The computer 28, for example, may be an ATMega8 microprocessor.

The computer 28 includes a memory and a processor programmed to execute instructions stored in the memory. The memory is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and data such as the wind speed and direction relative to the launch 10, vehicle heading, platform 14 orientation, speed of the variable speed drive wheel motor 26, etc. The instructions and data stored in the memory may be accessible to the processor and possibly other components of the launch 10, the vehicle 40, and/or the aerial vehicle 20.

With reference to blocks 105 and 110, the computer 28 is programmed to receive measurements of the wind speed and direction relative to the launch 10. The computer 28 may include instructions including receiving a measurement of wind speed and direction relative to a launch 10 on a vehicle 40. For example, the computer 28 may receive the measurement of the wind speed from the wind speed sensor 80, as shown in block 105, and may receive the measurement of the wind direction from the wind direction sensor 82, as shown in block 110.

With reference to block 115, the computer 28 is programmed to receive a measurement of a vehicle heading. The computer 28 may include instructions including receiving a measurement of vehicle heading of the vehicle 40, and controlling the speed of the at least one drive motor of the launch 10 based on the vehicle heading. The computer 28 may receive the measurement of the vehicle heading from the vehicle heading sensor 84.

Once the computer 28 receives the speed and direction of the wind relative to the launch 10, and the heading of the vehicle 40, the speed of the wind relative to the launch 10 may be represented as an array of North-South and East-West vectors:

$$V_{launch} = \begin{pmatrix} V_N \\ V_E \end{pmatrix}$$

The computer 28 may then calculate a normalized wind speed using the 2-D rotational matrix M, where $\phi$ represents the vehicle heading:

$$M = \begin{pmatrix} \cos\phi & -\sin\phi \\ \sin\phi & \cos\phi \end{pmatrix}$$

giving $$V_{wind} = MV_{launch}$$

With reference to blocks 120 and 125, the computer 28 is programmed to adjust the orientation of the platform 14 and/or the speed of the variable speed drive wheel motor 26 based on the wind speed and direction relative to the launch 10 and/or the vehicle heading. With reference to block 120, the computer 28 is programmed to control the speed of the drive wheel motor 26 based at least on the measurements of the wind speed and direction relative to the launch 10. The computer 28 may include instructions including controlling the speed of the at least one drive wheel motor 26 of the launch 10 to propel the aerial vehicle 20 based at least on the measurements of the wind speed and direction relative to the launch 10. With continued reference to block 120, the computer 28 is programmed to control the speed of the at least one drive wheel motor 26 based at least on the measurement of the vehicle heading. The computer 28 may include instructions including controlling the speed of the at least one drive wheel motor 26 of the launch 10 based on the vehicle heading. Specifically, the computer 28, for example, may include a lookup table to determine the speed of the variable speed drive wheel motor 26 based on the wind speed and direction relative to the launch 10 and/or based on the vehicle heading. The lookup table may be based on empirical data. This empirical data is gathered with an emphasis on providing aerodynamic stability to the aerial vehicle 20 in early stages of flight. Controlling the launch 10 based on this empirical data drives the variable speed drive wheel motor 26 at levels that compensate for turbulence created by the vehicle 40 as the aerial vehicle 20 is being launched.

With reference to block 125, the computer 28 is programmed to adjust at least one of the position motors 46, 48, 50 based at least on the measurement of the wind speed and direction relative to the launch 10 and based at least on the measurement of the vehicle heading. The computer 28 may include instructions including adjusting at least one of the position motors 46, 48, 50 to adjust at least one of rotation of a platform 14 of the launch 10 relative to a base 44 of the launch 10, height of the platform 14 relative to the base 44, and launch angle of the platform 14 relative to the base 44 based at least on measurements of the wind speed and direction relative to the launch 10 and based at least on the vehicle heading. Specifically, the computer 28, for example, may include a lookup table to determine the rotation, height, and launch angle of the platform 14 relative to the base 44 based on the wind speed and direction relative to the launch 10 and/or based on the vehicle heading. The lookup table may be based on empirical data. This empirical data is gathered with an emphasis on providing aerodynamic stability to the aerial vehicle 20 in early stages of flight. Controlling the launch 10 based on this empirical data orients the platform 14 at a position that compensate for turbulence created by the vehicle 40 as the aerial vehicle 20 is being launched.

As shown in decision block 130, the decision to launch 10 the aerial vehicle 20 is made. If the aerial vehicle 20 is not launched, the orientation of the platform 14 and/or the speed of the variable speed drive wheel motor 26 may be continuously adjusted based on updated measurements of the wind speed and direction relative to the launch 10 and/or based on the vehicle heading. The decision to launch 10 may be manually input by the operator of the vehicle 40, or may be automatically generated by the computer 28 based on detection of predetermined parameters, e.g., location of the vehicle 40 near a target, wind speed and direction, and/or vehicle heading, etc.

As shown in FIG. 6, the computer 28 is in communication with the motor 34 of the aerial vehicle 20, e.g., through the computer 38 of the aerial vehicle 20. The computer 28 is programmed to control a propeller 36 of the aerial vehicle 20 to move the rudder 18 into engagement with the drive motor, as identified in block 135 in FIG. 7. Specifically, in response to receiving an input that the decision has been made to launch the aerial vehicle 20, the computer 28 instructs the motor 34 of the aerial vehicle 20 to drive the propeller 36 to move the rudder 18 of the aerial vehicle 20 along the slot 16 and into the space 24 between the drive wheels 22 to engage the rudder 18 with the drive wheels 22. The computer 28 includes instructions including controlling the propeller 36, i.e., by way of the motor 34, to move the rudder 18 into engagement with the drive motor.

Since the variable speed drive wheel motor 26 drives rudder 18 of the aerial vehicle 20, the aerial vehicle 20 may be launched when the vehicle 40 is either stationary or moving. The variable speed drive wheel motor 26 may launch 10 the aerial vehicle 20 at any suitable speed to overcome wind speed relative to the launch 10, i.e., wind resulting from atmospheric winds plus movement of the vehicle 40. The rotating mechanism 52, lifting mechanism 60, and pivoting mechanism 70 may position the platform 14 in any suitable orientation to launch 10 the aerial vehicle 20 in a selected direction. The lifting mechanism 60 may lift the platform 14 above the vehicle 40, e.g., above the cab of the pickup truck in the example shown in FIGS. 1 and 2. In this position, the rotating mechanism 52 may rotate the platform 14 in 360 degrees to any selected rotational orientation. In some scenarios, when the rotating mechanism 52 rotates the platform 14 to launch 10 the aerial vehicle 20 in the same direction as the movement of the vehicle 40, the variable speed drive wheel motor 26 may be driven at a suitable speed to overcome the resulting wind speed and launch 10 the aerial vehicle 20 in the same direction as the movement of the vehicle 40.

In general, the computer 28 described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform 14 for Infotainment offered by QNX Software Systems. Examples of computing devices include, without limitation, an on-board vehicle computer, a computer workstation, a server, a desktop, notebook, laptop, or handheld computer, or some other computing system and/or device.

Computers, such as computer 28, generally include computer-executable instructions, where the instructions may be executable by one or more computers such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer 28 can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An unmanned vehicle launch comprising:
a frame including a platform defining a slot designed to slideably receive a rudder of a fixed-wing unmanned aerial vehicle;
two drive wheels rotatably supported by the frame and defining a space between each other, the space being open to the slot and designed to receive the rudder;
at least one variable speed drive wheel motor supported by the frame and operatively engaged with the drive wheels;
wind speed sensor;
a wind direction sensor; and
a computer in communication with the variable speed drive wheel motor, the wind speed sensor, and the wind direction sensor, the computer programmed to receive measurements of the wind speed relative to the launch from the wind speed sensor and wind direction relative to the launch from the wind direction sensor and programmed to drive the variable speed drive wheel motor at various speeds based at least on the measurements of the wind speed and wind direction.

2. The unmanned vehicle launch as set forth in claim 1, wherein the computer is programmed to receive a measurement of a vehicle heading and is programmed to control the speed of the at least one drive motor based at least on the measurement of the vehicle heading.

3. The unmanned vehicle launch as set forth in claim 2, further comprising a base supporting the frame and at least one position motor configured to adjust at least one of rotation of the platform relative to the base, height of the platform relative to the base, and launch angle of the platform relative to the base, and the computer is programmed to adjust the at least one position motor based at least on the measurement of the wind speed and wind direction relative to the launch and based at least on the measurement of the vehicle heading.

4. The unmanned vehicle launch as set forth in claim 1, further comprising at least one sensor configured to measure wind speed and wind direction relative to the launch.

5. The unmanned vehicle launch as set forth in claim 4, further comprising a base supporting the frame, wherein the at least one sensor is supported on the base.

6. The unmanned vehicle launch as set forth in claim 4, wherein the at least one sensor is a wind vane, an airspeed sensor on the wind vane, and a magnetometer on the wind vane.

7. The unmanned vehicle launch as set forth in claim 1, further comprising a base supporting the frame and at least one position motor configured to adjust at least one of rotation of the platform relative to the base, height of the platform relative to the base, and launch angle of the platform relative to the base.

8. The unmanned vehicle launch as set forth in claim 7, wherein the computer is programmed to adjust the at least one position motor based at least on the measurements of the wind speed and wind direction relative to the launch.

9. The unmanned vehicle launch as set forth in claim 1, wherein the computer is programmed to control a propeller of the fixed-wing unmanned aerial vehicle to move the rudder into engagement with the drive wheel.

10. The unmanned vehicle launch as set forth in claim 1, further comprising a base supporting the frame, wherein the platform is moveable relative to the base in three degrees of freedom.

11. The unmanned vehicle launch as set forth in claim 1, further comprising a base supporting the frame, and a lifting mechanism between the base and the platform, the lifting mechanism being designed to translationally move the platform relative to the base.

12. The unmanned vehicle launch as set forth in claim 1, further comprising a base supporting the frame, and a rotating mechanism between the base and the platform, the rotating mechanism being designed to rotate the platform relative to the base.

13. The unmanned vehicle launch as set forth in claim 1, further comprising a base supporting the frame, and a pivoting mechanism between the base and the platform, the pivoting mechanism being designed to pivot the platform relative to the base.

14. A launch kit comprising:
a frame having a platform defining a slot;
a rudder for a fixed-wing unmanned aerial vehicle, the rudder being slideably engageable with the slot;
two drive wheels rotatably supported by the frame and engageable with the rudder;
at least one variable speed motor supported by the frame and operatively engaged with the drive wheels;
a wind speed sensor;
a wind direction sensor; and
a computer in communication with the variable speed motor, the wind speed sensor, and the wind direction sensor, the computer programmed to receive measurements of wind speed from the wind speed sensor and wind direction from the wind direction sensor and programmed to drive the variable speed motor at various speeds based at least on the measurements of the wind speed and wind direction.

* * * * *